US012592635B2

(12) United States Patent
Lin et al.

(10) Patent No.: US 12,592,635 B2
(45) Date of Patent: Mar. 31, 2026

(54) RESONANT CONVERTER

(71) Applicant: Delta Electronics, Inc., Taoyuan City (TW)

(72) Inventors: You-Si Lin, Taoyuan City (TW); Sergio Fernandez Rojas, Taoyuan City (TW); Sheng-Hua Li, Taoyuan City (TW); Yu-Chi Hsu, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 311 days.

(21) Appl. No.: 18/369,747

(22) Filed: Sep. 18, 2023

(65) Prior Publication Data

US 2024/0405687 A1     Dec. 5, 2024

(30) Foreign Application Priority Data

Jun. 1, 2023   (CN) ......................... 202310642753.1

(51) Int. Cl.
*H02M 3/00* (2006.01)
*H02M 1/00* (2007.01)
*H02M 3/335* (2006.01)

(52) U.S. Cl.
CPC ........... *H02M 3/01* (2021.05); *H02M 1/0009* (2021.05); *H02M 3/33573* (2021.05); *H02M 1/0022* (2021.05)

(58) Field of Classification Search
CPC .... H02M 1/0009; H02M 1/0022; H02M 1/15; H02M 3/01; H02M 3/33569–3/33592
See application file for complete search history.

(56) References Cited

U.S. PATENT DOCUMENTS 9,379,617  B2    6/2016  Nishikawa
11,437,917  B2    9/2022  Yu et al.
(Continued)

FOREIGN PATENT DOCUMENTS

CN      111983282 A    11/2020
CN      113189392 A     7/2021
(Continued)

OTHER PUBLICATIONS

Z. Hu, Y.-F. Liu and P. C. Sen, "Bang-Bang Charge Control for LLC Resonant Converters," in IEEE Transactions on Power Electronics, vol. 30, No. 2, pp. 1093-1108, Feb. 2015, doi: 10.1109/TPEL.2014. 2313130. (Year: 2015).*
(Continued)

*Primary Examiner* — Fred E Finch, III
(74) *Attorney, Agent, or Firm* — KIRTON McCONKIE; Evan R. Witt

(57) ABSTRACT

A resonant converter including a full-bridge switch circuit, a resonant circuit, a transformer, a rectifier circuit, a current sensor and a controller is provided. The full-bridge switch circuit includes switches. The resonant circuit is electrically connected to the full-bridge switch circuit and includes a resonant inductor. The transformer includes primary and secondary windings, and the primary winding is electrically connected to the resonant circuit. The rectifier circuit is electrically connected to the secondary winding. The current sensor is electrically connected to the resonant circuit. When a current flowing through the resonant inductor passes through the current sensor, the current sensor generates a current differential signal correspondingly. The controller performs double integration on the current differential signal to acquire an electric charge signal and controls operation of the switches of the full-bridge switch circuit according to the
(Continued)

1 electric charge signal and the input and output voltages of the resonant converter.

19 Claims, 7 Drawing Sheets

(56) References Cited

U.S. PATENT DOCUMENTS

| | | | |
|---|---|---|---|
| 2022/0286056 A1* | 9/2022 | Chiu | ................ H02M 3/33573 |
| 2023/0088584 A1* | 3/2023 | Panov | ................ H02M 1/0009 |
| | | | 323/271 |
| 2023/0131297 A1* | 4/2023 | Escudero Rodriguez | ................... |
| | | | H02M 3/33592 |
| | | | 363/21.06 |

FOREIGN PATENT DOCUMENTS

| | | | | | |
|---|---|---|---|---|---|
| CN | 113744608 | A | 12/2021 | | |
| CN | 115833605 | A | 3/2023 | | |
| JP | 6272036 | B2 | 1/2018 | | |
| TW | 202312636 | A | 3/2023 | | |
| WO | WO-2022101138 | A1 * | 5/2022 | .............. | H02M 3/01 |

OTHER PUBLICATIONS

Zhiyuan Hu et al.: "Bang-Bang Charge Control for LLC Resonant Converters", IEEE, Feb. 2015.
Sueker, Keith H: "Rogowski Coils", Elsevier science & Technology, 2005.

* cited by examiner

RESONANT CONVERTER

CROSS-REFERENCE TO RELATED APPLICATION

This application claims priority to China Patent Application No. 202310642753.1, filed on Jun. 1, 2023, and the entire contents of which are incorporated herein by reference for all purposes.

FIELD OF THE INVENTION

The present disclosure relates to a resonant converter, and more particularly to a resonant converter capable of improving the dynamic response.

BACKGROUND OF THE INVENTION

For full-bridge series resonant converters, the conventional control method adopts dual-loop control, as shown in FIG. 1. In the dual-loop control, the outer loop controls the voltage, the inner loop controls the current, and the control signal is generated through variable-frequency modulation. However, the bandwidth under the dual-loop control is small, which causes bad dynamic response.

In addition, in a conventional approach, the Rogowski coil is disposed on the secondary side to obtain a current differential signal, then an instantaneous current signal is acquired through integrating the current differential signal, and finally an average current signal is acquired by an average current controller accordingly. However, this conventional approach would limit the dynamic response of the converter and is unable to eliminate the ripples of the output voltage and current.

Therefore, there is a need of providing a resonant converter in order to overcome the drawbacks of the conventional technologies.

SUMMARY OF THE INVENTION

The present disclosure provides a resonant converter. In the resonant converter, the electric charge signal is acquired by a current sensor disposed on a primary side and the double integration, and the operation of primary switches is controlled according to the electric charge signal and the input and output voltages of the resonant converter, thereby improving the dynamic response of the resonant converter and eliminating the ripples of the output voltage and current.

In accordance with an aspect of the present disclosure, a resonant converter is provided. The resonant converter includes a full-bridge switch circuit, a resonant circuit, a transformer, a rectifier circuit, a current sensor and a controller. The full-bridge switch circuit includes a plurality of switches and receives an input voltage. The resonant circuit is electrically connected to the full-bridge switch circuit and includes a resonant inductor. The transformer includes a primary winding and a secondary winding, and the primary winding is electrically connected to the resonant circuit. The rectifier circuit is electrically connected to the secondary winding of the transformer and provides an output voltage. The current sensor is electrically connected to the resonant circuit. When a current flowing through the resonant inductor passes through the current sensor, the current sensor generates a current differential signal correspondingly. The controller is configured to perform double integration on the current differential signal to acquire an electric charge signal, and to control operation of the plurality of switches of the full-bridge switch circuit according to the electric charge signal, the input voltage and the output voltage.

In accordance with another aspect of the present disclosure, a resonant converter is provided. The resonant converter includes a primary circuit, a transformer, a secondary circuit, a current sensor and a controller. The primary circuit is configured to receive an input voltage includes a resonant inductor. The transformer has a primary side electrically connected to the primary circuit. The secondary circuit is electrically connected to a secondary side of the transformer and is configured to provide an output voltage. The current sensor is electrically connected to the primary circuit. When a current flowing through the resonant inductor passes through the current sensor, the current sensor generates a current differential signal correspondingly. The controller is configured to perform double integration on the current differential signal to acquire an electric charge signal, and is configured to control operation of the resonant converter according to the electric charge signal, the input voltage and the output voltage.

In accordance with another aspect of the present disclosure, a resonant converter is provided. The resonant converter includes a switch circuit, a resonant circuit, a transformer, a rectifier circuit, a current sensor and a controller. The switch circuit includes a plurality of switches and receives an input voltage. The resonant circuit is electrically connected to the switch circuit. The transformer includes a primary winding and a secondary winding, and the primary winding is electrically connected to the resonant circuit. The rectifier circuit is electrically connected to the secondary winding of the transformer and provides an output voltage. The current sensor is electrically connected to the resonant circuit. When a current of the resonant circuit passes through the current sensor, the current sensor generates a current differential signal correspondingly. The controller is configured to perform double integration on the current differential signal to acquire an electric charge signal, and is configured to control operation of the plurality of switches of the switch circuit according to the electric charge signal, the input voltage and the output voltage.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
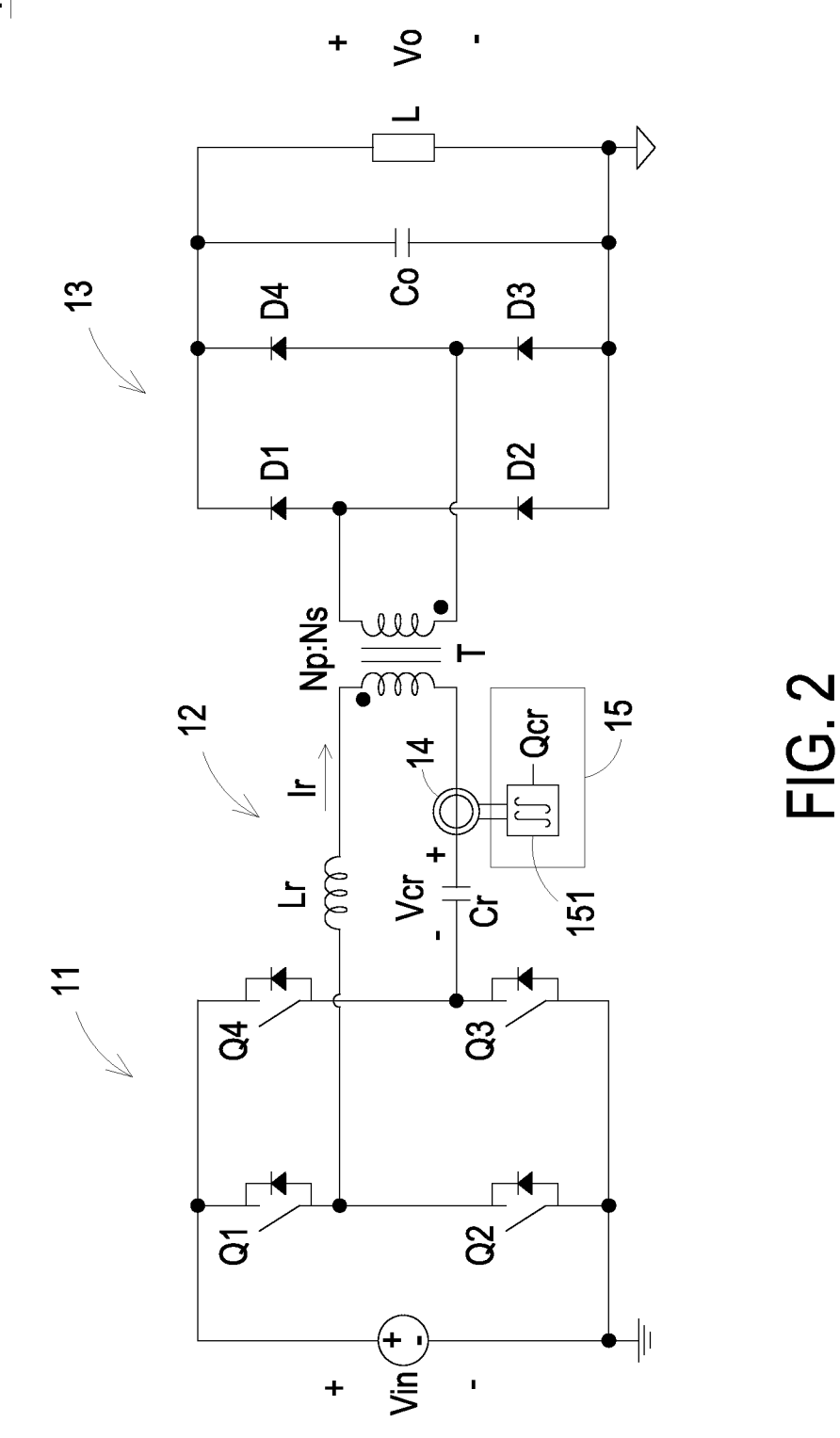
FIG. 2 is a schematic circuit diagram illustrating a resonant converter according to an embodiment of the present disclosure.

FIG. 2 is a schematic circuit diagram illustrating a resonant converter according to an embodiment of the present disclosure. As shown in FIG. 2, the resonant converter 1 of the present disclosure includes a switch circuit (for example but not limited to the full-bridge switch circuit 11 in FIG. 2), a resonant circuit 12, a transformer T, a rectifier circuit 13, a current sensor 14 and a controller 15. The switch circuit and the resonant circuit 12 form a primary circuit, and the rectifier circuit 13 forms a secondary circuit. The full-bridge switch circuit 11 includes a plurality of switches and receives an input voltage Vin. The resonant circuit 12 is electrically connected to the full-bridge switch circuit 11 and includes a resonant inductor Lr. A primary winding and a secondary winding of the transformer T are electrically connected to the resonant circuit 12 and the rectifier circuit 13 respectively, and the turns ratio of the primary and secondary windings is Np:Ns. The rectifier circuit 13 is configured to provide an output voltage Vo to a load L. The current sensor 14 is electrically connected to the resonant circuit 12. When a resonant current Ir flowing through the resonant inductor Lr passes through the current sensor 14, the current sensor 14 generates a current differential signal correspondingly. The current sensor 14 may include a coreless ring coil (e.g., Rogowski coil), but not limited thereto. The controller 15 is configured to perform double integration on the current differential signal generated by the current sensor 14 to obtain the electric charge signal Qcr. Further, the controller 15 controls the operation of the switches in the full-bridge switch circuit 11 according to the electric charge signal Qcr, the input voltage Vin and the output voltage Vo, thereby improving the dynamic response of the resonant converter 1 and eliminating the ripples of the output voltage Vo and output current.

In an embodiment, the full-bridge switch circuit 11 includes switches Q1, Q2, Q3 and Q4. The switches Q1 and Q2 are electrically connected in series to form a first bridge arm, the switches Q3 and Q4 are electrically connected in series to form a second bridge arm, and the first bridge arm and the second bridge arm are electrically connected in parallel to each other.

In an embodiment, the resonant circuit 12 further includes a resonant capacitor Cr. Two terminals of the resonant inductor Lr are electrically connected to a connection node between switches Q1 and Q2 and a first terminal of the primary winding respectively. Two terminals of the resonant capacitor Cr are electrically connected to a connection node between switches Q3 and Q4 and a second terminal of the primary winding respectively. The current sensor 14 is electrically connected between the resonant capacitor Cr and the second terminal of the primary winding.

In an embodiment, the rectifier circuit 13 includes diodes D1, D2, D3 and D4. The diodes D1 and D2 are electrically connected in series to form a third bridge arm, the diodes D3 and D4 are electrically connected in series to form a fourth bridge arm, and the third bridge arm and the fourth bridge arm are electrically connected in parallel to each other. A first terminal and a second terminal of the secondary winding of the transformer T are electrically connected to a connection node between diodes D1 and D2 and a connection node between diodes D3 and D4 respectively. In the transformer T, the first terminal of the primary winding and the second terminal of the secondary winding are dotted terminals. In an embodiment, the resonant converter 1 further includes an output capacitor Co electrically connected in parallel to the third and fourth bridge arms.

Moreover, based on the sensing result of the current sensor 14, a current sensing voltage Vsns can be obtained, and the current sensing voltage Vsns and the resonant current Ir have a relation as:

$$Vsns \propto \int \int dIr. \tag{1}$$

It may be further derived that:

$$Vsns \propto \int Ir \propto \int dVcr, \tag{2}$$

wherein Vcr is the voltage across the resonant capacitor Cr. Based on equation (2), it is derived that:

$$Vsns \approx Ksns \cdot Vcr, \tag{3}$$

wherein Ksns is a constant.

Figure 3:
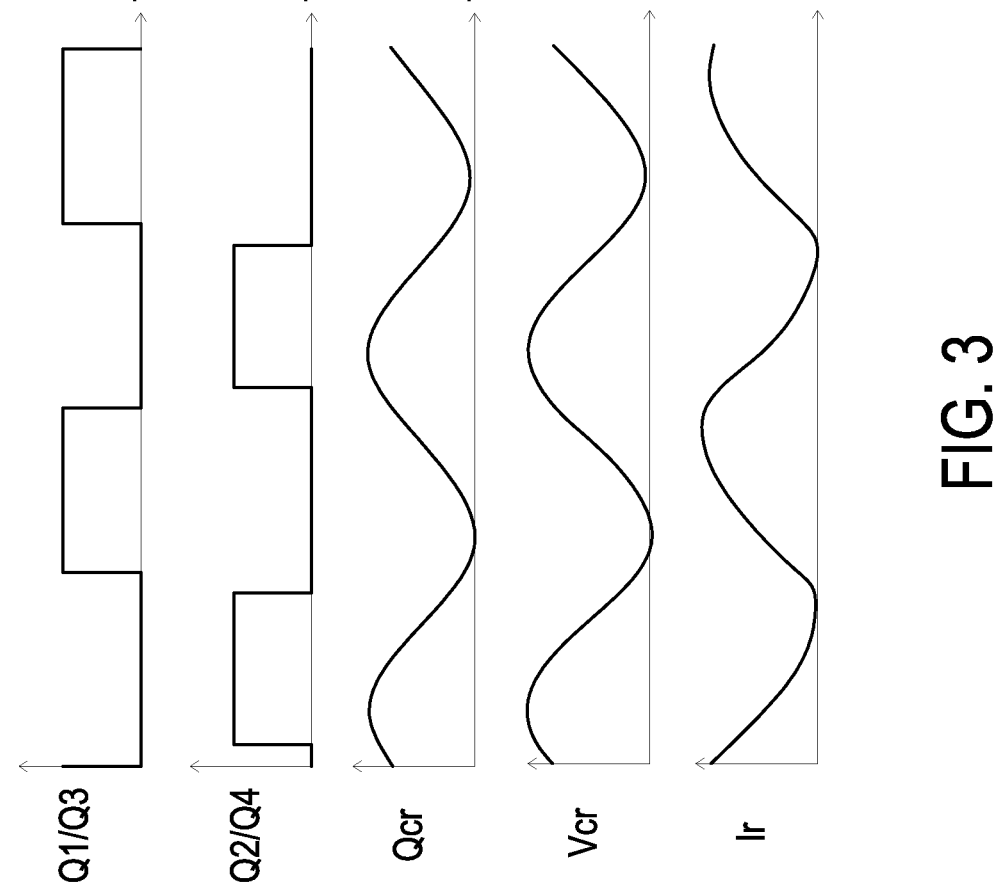
FIG. 3 schematically shows the working waveforms of the resonant converter of FIG. 2.

FIG. 3 schematically shows the working waveforms of the resonant converter of FIG. 2. In FIGS. 3, Q1, Q2, Q3 and Q4 represent the control signals of switches Q1, Q2, Q3 and Q4 respectively. As shown in FIG. 3, the electric charge signal Qcr, obtained by the current sensor 14 and the double integration, has the same frequency and phase as the voltage Vcr across the resonant capacitor Cr. Compared to the conventional approach in which the electric charge signal is obtained through sensing the voltage across the resonant capacitor by an isolated operational amplifier, the approach of the present disclosure can avoid limiting the bandwidth and performing additional switching for sensing the signals in different half cycles and can obtain the required electric charge signal by simpler circuit structure.

Figure 4:
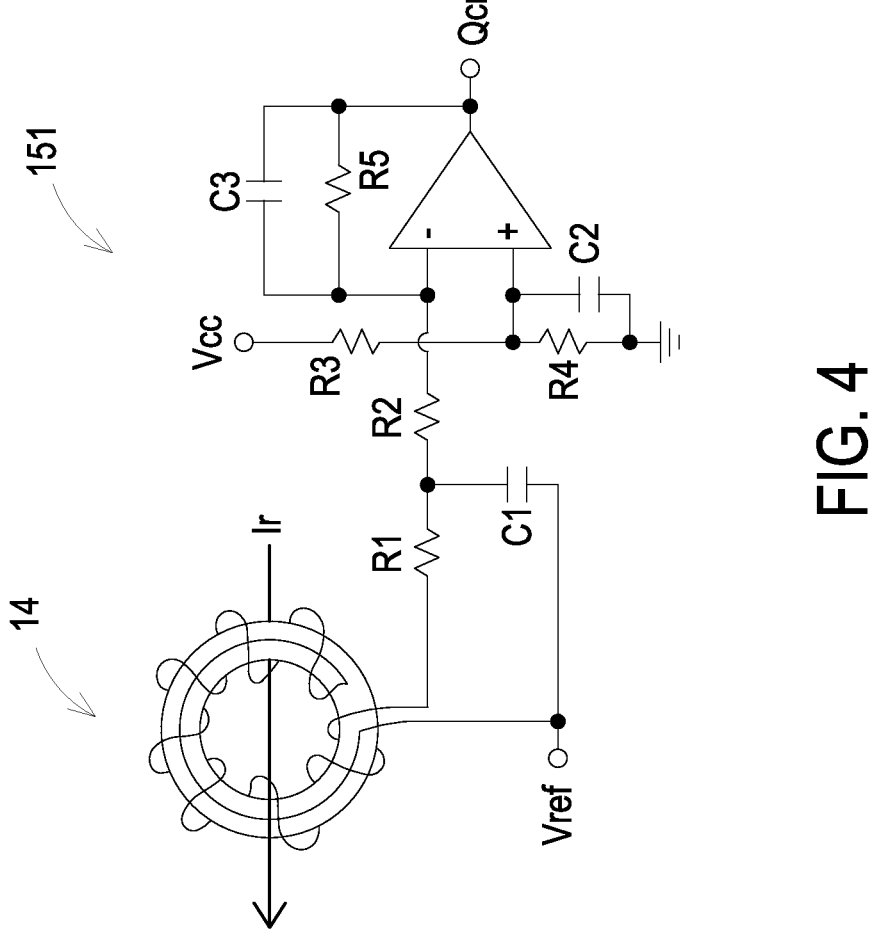
FIG. 4 is a schematic circuit diagram illustrating the current sensor and the double integrator circuit of the controller of the resonant converter of FIG. 2.

In an embodiment, as shown in FIG. 2, the controller 15 includes a double integrator circuit 151. The double integrator circuit 151 is electrically connected to the current sensor 14 for receiving the current differential signal, and the double integrator circuit 151 performs double integration on the current differential signal to acquire the electric charge signal Qcr. FIG. 4 exemplifies the circuit structure of the current sensor 14 and the double integrator circuit 151 of the controller 15. In an embodiment, as shown in FIG. 4, the double integrator circuit 151 includes resistors R1, R2, R3, R4 and R5, capacitors C1, C2 and C3, and a comparator Cmp. In this embodiment, the current sensor 14 is a Rogowski coil, one terminal of the Rogowski coil is electrically connected to a first terminal of resistor R1, and the other terminal of the Rogowski coil is electrically connected to a first terminal of capacitor C1 and a reference voltage Vref. A second terminal of resistor R1 is connected to a second terminal of capacitor C1, and the resistor R1 and the capacitor C1 form a passive RC integrator. The resistor R2 is electrically connected between the second terminal of resistor R1 and a negative input terminal of comparator Cmp. The resistors R3 and R4 are electrically connected in series between a supply voltage Vcc and a ground terminal, and the connection node between resistors R3 and R4 is electrically connected to the positive input terminal of comparator Cmp. The capacitor C2 is electrically connected in parallel to the resistor R4. An output terminal of comparator Cmp outputs the electric charge signal Qcr. Two terminals of resistor R5 are electrically connected to the negative input terminal and the output terminal of the comparator Cmp respectively, and the capacitor C3 is electrically connected in parallel to the resistor R5.

Figure 5:
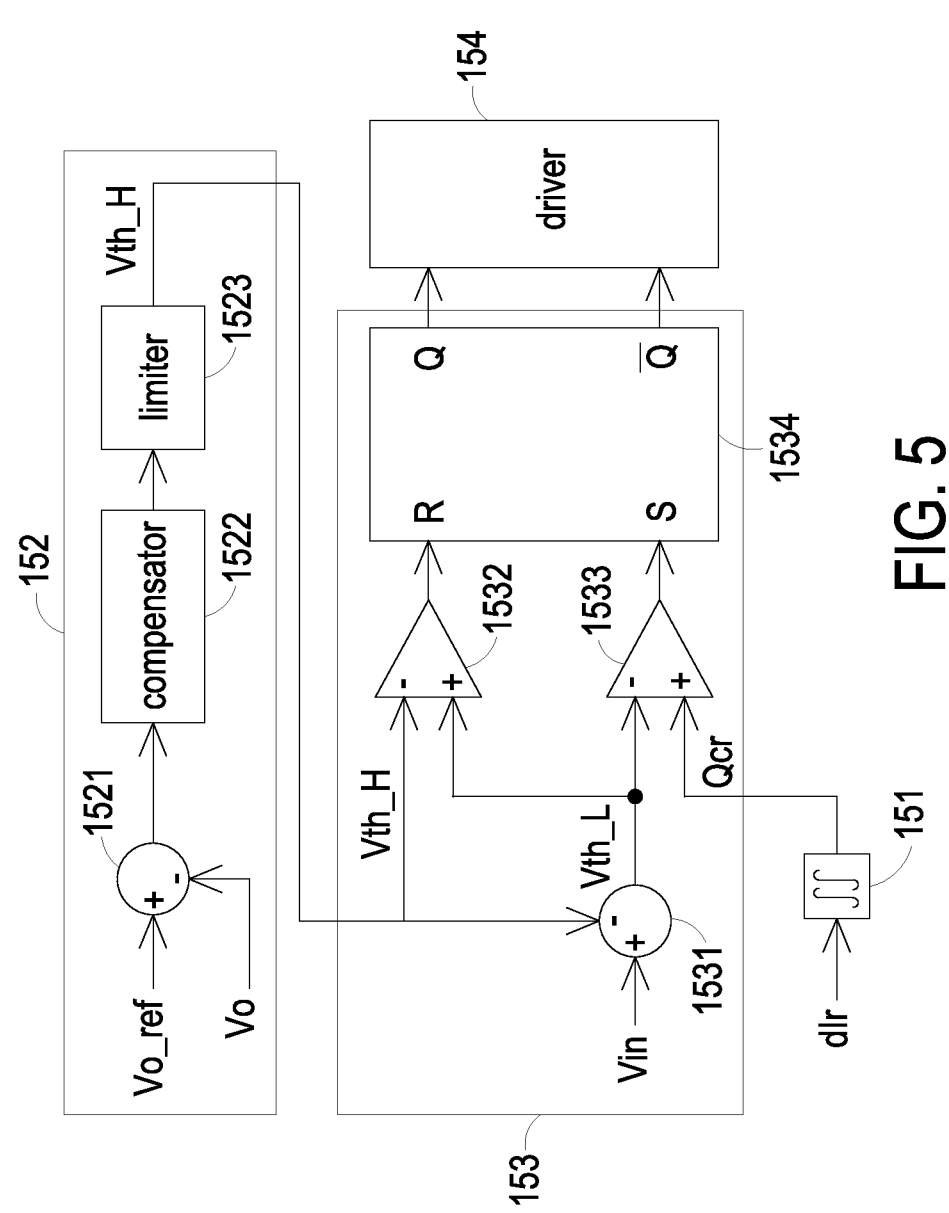
FIG. 5 schematically shows the control architecture of the controller of FIG. 2.

FIG. 5 schematically shows the control architecture of the controller 15 of FIG. 2. In an embodiment, as shown in FIG. 5, the controller 15 includes the double integrator circuit 151, a voltage compensation circuit 152, a modulation circuit 153 and a driver 154. The modulation circuit 153 is electrically connected to the voltage compensation circuit 152, the double integrator circuit 151 and the driver 154. The voltage compensation circuit 152 generates an upper threshold voltage Vth_H according to the output voltage Vo and a reference output voltage Vo_ref. The modulation circuit 153 generates a modulation signal according to the input voltage Vin, the upper threshold voltage Vth_H and the electric charge signal Qcr. According to the modulation signal, the driver 154 generates the control signal utilized for controlling the operation of the switches in the full-bridge switch circuit 11.

In this embodiment, the voltage compensation circuit 152 includes a first operator 1521, a compensator 1522 and a limiter 1523 electrically connected to each other. The first operator 1521 calculates the difference between the output voltage Vo and the reference output voltage Vo_ref, the compensator 1522 generates a compensation signal according to the difference, and the limiter 1523 generates the upper threshold voltage Vth_H according to the compensation signal.

The modulation circuit 153 includes a second operator 1531, a first comparator 1532, a second comparator 1533 and a flip-flop 1534. The second operator 1531 calculates the difference between the input voltage Vin and the upper threshold voltage Vth_H, and the difference is regarded as a lower threshold voltage Vth_L. A positive input terminal and a negative input terminal of the first comparator 1532 receive the lower threshold voltage Vth_L and the upper threshold voltage Vth_H respectively. A positive input terminal and a negative input terminal of the second comparator 1533 receive the electric charge signal Qcr and the lower threshold voltage Vth_L respectively. An output terminal of the first comparator 1532 is electrically connected to the flip-flop 1534 for providing a first comparison signal to the flip-flop 1534. An output terminal of the second comparator 1533 is electrically connected to the flip-flop 1534 for providing a second comparison signal to the flip-flop 1534. The flip-flop 1534 generates the modulation signal according to the first comparison signal and the second comparison signal. In an embodiment, the flip-flop 1534 includes an RS flip-flop, the R input terminal of the RS flip-flop is electrically connected to the output terminal of the first comparator 1532 for receiving the first comparison signal, and the S input terminal of the RS flip-flop is electrically connected to the output terminal of the second comparator 1533 for receiving the second comparison signal.

Figure 1:
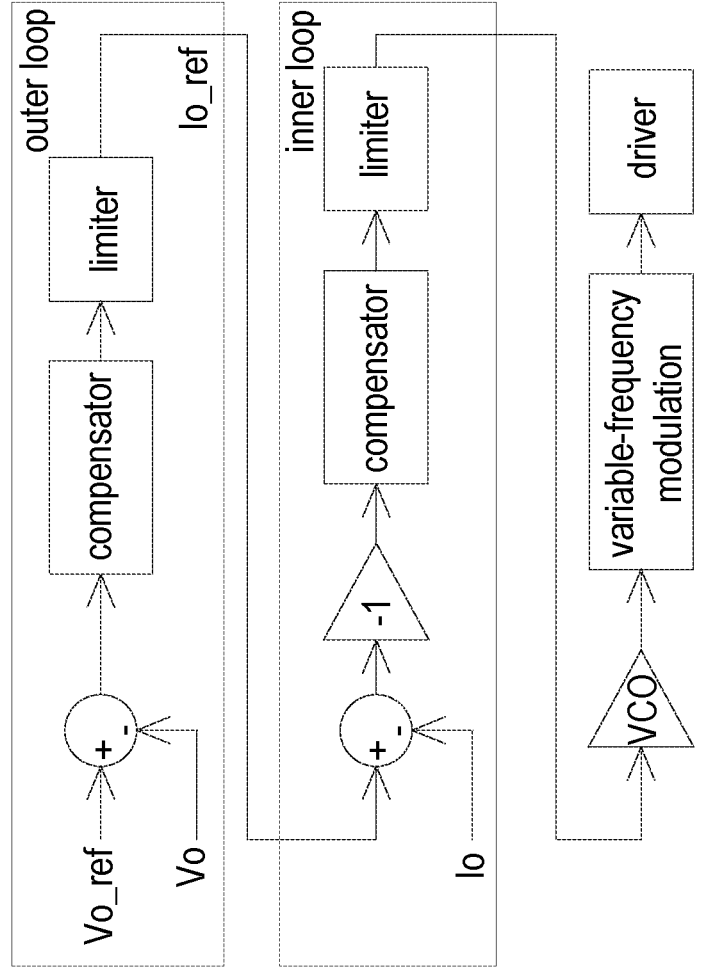
FIG. 1 schematically shows the control architecture of a conventional dual-loop control for a full-bridge series resonant converter.
Figure 6:
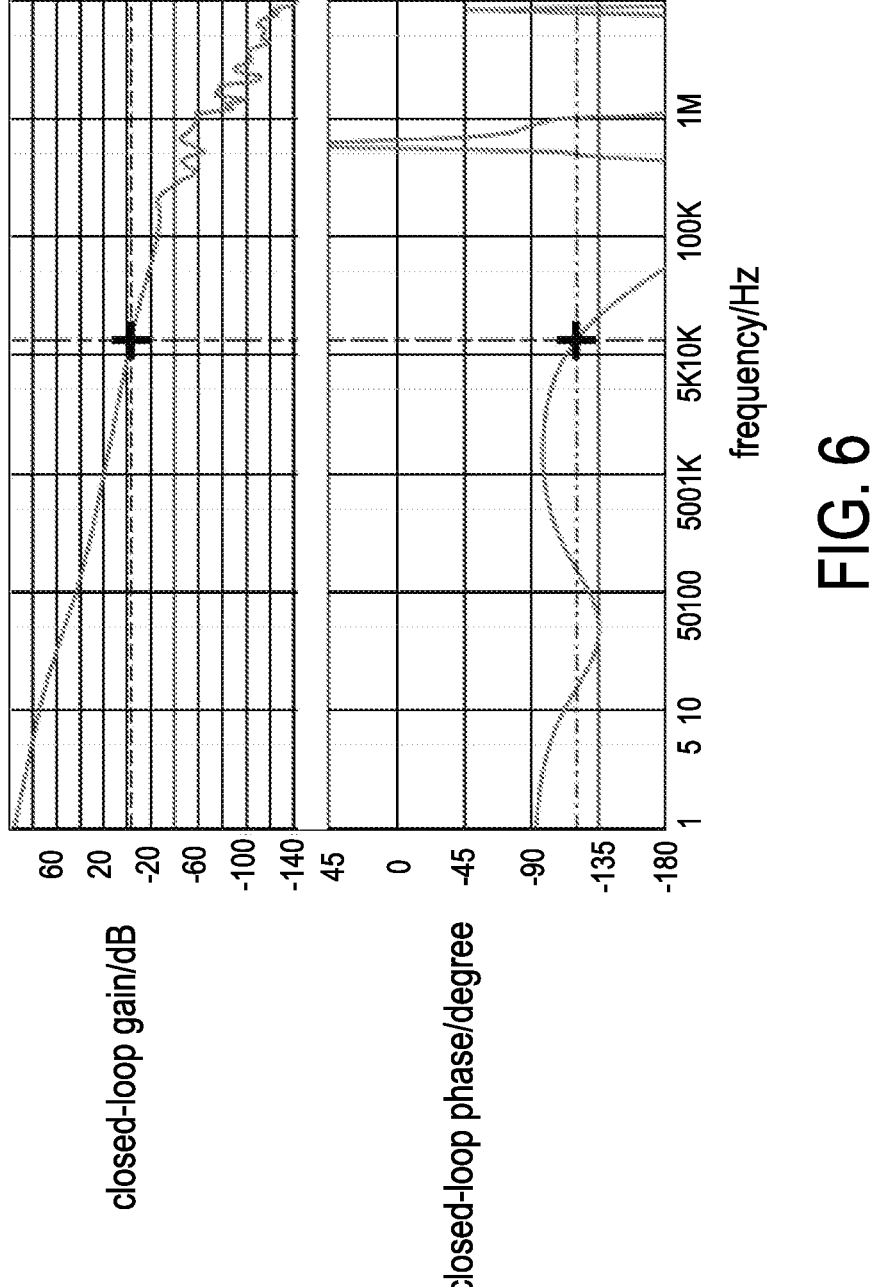
FIG. 6 exemplifies a Bode plot of the closed-loop gain and phase in the case that the resonant converter of FIG. 2 adopts the control architecture of present disclosure shown in FIG. 5.
Figure 7:
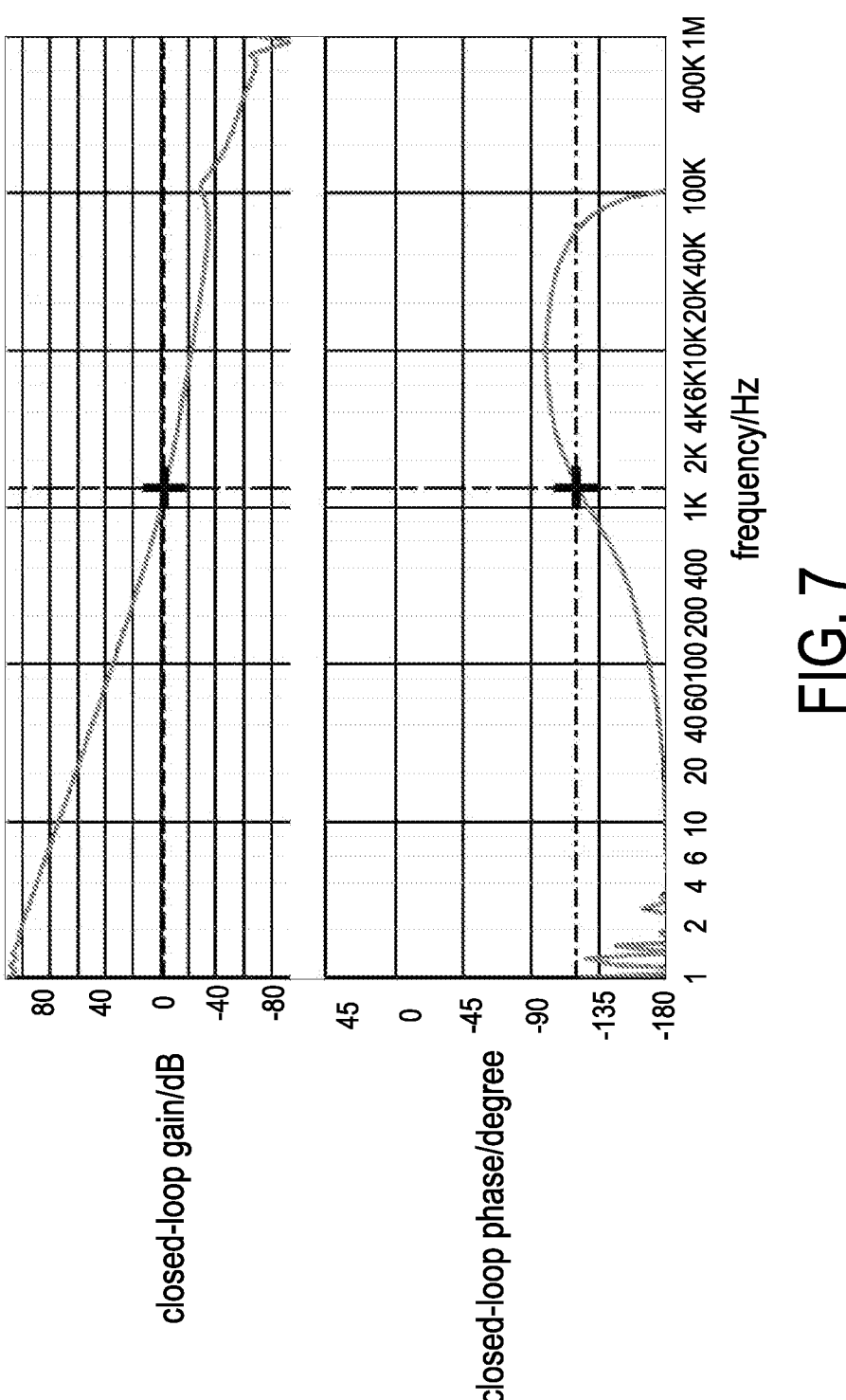
FIG. 7 exemplifies a Bode plot of the closed-loop gain and phase in the case that the resonant converter of FIG. 2 adopts the conventional control architecture of FIG. 1

FIG. 6 exemplifies a Bode plot of the closed-loop gain and phase in the case that the resonant converter 1 of FIG. 2 adopts the control architecture of present disclosure shown in FIG. 5. FIG. 7 exemplifies a Bode plot of the closed-loop gain and phase in the case that the resonant converter 1 of FIG. 2 adopts the conventional control architecture of FIG. 1. The waveforms of FIG. 6 and FIG. 7 are both obtained under the same conditions: the input voltage Vin of 400 Vdc, the output voltage Vo of 300 Vdc and the switching frequency fs of 440 kHz. As shown in FIG. 6 and FIG. 7, with the phase margin of 60 degrees, the bandwidth is 1.3 kHz while adopting the conventional control architecture, and the bandwidth is 13.6 kHz while adopting the control architecture of the present disclosure. It is noted that the bandwidth under the control architecture of the present disclosure is ten times the bandwidth under the conventional control architecture. Therefore, with the same phase margin, the bandwidth under the control architecture of the present disclosure would be much larger than the bandwidth under the conventional control architecture. In other words, under the same stability condition, the control architecture of the present disclosure provides better dynamic response.

In summary, the present disclosure provides a resonant converter. In the resonant converter, the electric charge signal is acquired by a current sensor disposed on a primary side and the double integration, and the operation of primary switches is controlled according to the electric charge signal and the input and output voltages of the resonant converter, thereby improving the dynamic response of the resonant converter and eliminating the ripples of the output voltage and current.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A resonant converter, comprising:
a full-bridge switch circuit, comprising a plurality of switches, and receiving an input voltage;
a resonant circuit, electrically connected to the full-bridge switch circuit, and comprising a resonant inductor;
a transformer, comprising a primary winding and a secondary winding, wherein the primary winding is electrically connected to the resonant circuit;
a rectifier circuit, electrically connected to the secondary winding of the transformer, and providing an output voltage;
a current sensor, electrically connected to the resonant circuit, wherein when a current flowing through the resonant inductor passes through the current sensor, the current sensor generates a current differential signal correspondingly; and
a controller, configured to perform double integration on the current differential signal to acquire an electric charge signal, and configured to control operation of the plurality of switches of the full-bridge switch circuit according to the electric charge signal, the input voltage and the output voltage,
wherein the current sensor comprises a coreless ring coil.

2. The resonant converter according to claim 1, wherein the resonant circuit further comprises a resonant capacitor, the resonant inductor and the resonant capacitor are electrically connected to two terminals of the primary winding respectively, and the current sensor is electrically connected between the resonant capacitor and the primary winding.

3. The resonant converter according to claim 2, wherein the electrical charge signal and a voltage across the resonant capacitor have same frequency and phase.

4. The resonant converter according to claim 1, wherein the controller comprises a double integrator circuit electrically connected to the current sensor for receiving the current differential signal, and the double integrator circuit performs the double integration on the current differential signal to acquire the electric charge signal.

5. The resonant converter according to claim 4, wherein the controller further comprises a voltage compensation circuit, a modulation circuit and a driver, the modulation circuit is electrically connected to the voltage compensation circuit, the double integrator circuit and the driver, the voltage compensation circuit generates an upper threshold voltage according to the output voltage and a reference output voltage, the modulation circuit generates a modulation signal according to the input voltage, the upper threshold voltage and the electric charge signal, the driver generates a control signal according to the modulation signal, and the control signal is utilized to control the operation of the plurality of switches of the full-bridge switch circuit.

6. The resonant converter according to claim 5, wherein the voltage compensation circuit comprises a first operator, a compensator and a limiter electrically connected to each other, the first operator calculates a difference between the output voltage and the reference output voltage, the compensator generates a compensation signal according to the difference, and the limiter generates the upper threshold voltage according to the compensation signal.

7. The resonant converter according to claim 5, wherein the modulation circuit comprises a second operator, a first comparator, a second comparator and a flip-flop, the second operator calculates a difference between the input voltage and the upper threshold voltage, the difference is regarded as a lower threshold voltage, a positive input terminal and a negative input terminal of the first comparator receive the lower threshold voltage and the upper threshold voltage respectively, a positive input terminal and a negative input terminal of the second comparator receive the electric charge signal and the lower threshold voltage respectively, the first comparator and the second comparator outputs a first comparison signal and a second comparison signal to the flip-flop respectively, and the flip-flop generates the modulation signal according to the first comparison signal and the second comparison signal.

8. The resonant converter according to claim 7, wherein the flip-flop comprises an RS flip-flop, an R input terminal and an S input terminal of the RS flip-flop receive the first comparison signal and the second comparison signal respectively.

9. The resonant converter according to claim 1, wherein the coreless ring coil comprises a Rogowski coil.

10. The resonant converter according to claim 1, wherein the plurality of switches of the full-bridge switch circuit comprises a first switch, a second switch, a third switch and a fourth switch, a first bridge arm formed by the first switch and the second switch electrically connected in series is electrically connected in parallel to a second bridge arm formed by the third switch and the fourth switch electrically connected in series, and a connection node between the first switch and the second switch and a connection node between the third switch and the fourth switch are electrically connected to two terminals of the primary winding respectively.

11. The resonant converter according to claim 1, wherein the rectifier circuit comprises a first diode, a second diode, a third diode and a fourth diode, a third bridge arm formed by the first diode and the second diode electrically connected in series is electrically connected in parallel to a fourth bridge arm formed by the third diode and the fourth diode electrically connected in series, and a connection node between the first diode and the second diode and a connection node between the third diode and the fourth diode are electrically connected to two terminals of the secondary winding respectively.

12. A resonant converter, comprising:
a primary circuit, configured to receive an input voltage, and comprising a resonant inductor;
a transformer, having a primary side electrically connected to the primary circuit;
a secondary circuit, electrically connected to a secondary side of the transformer, and configured to provide an output voltage;
a current sensor, electrically connected to the primary circuit, wherein when a current flowing through the resonant inductor passes through the current sensor, the current sensor generates a current differential signal correspondingly; and
a controller, configured to perform double integration on the current differential signal to acquire an electric charge signal, and configured to control operation of the resonant converter according to the electric charge signal, the input voltage and the output voltage,
wherein the current sensor comprises a coreless ring coil.

13. The resonant converter according to claim 12, wherein the primary circuit further comprises a resonant capacitor electrically connected to the resonant inductor, and the current sensor is electrically connected to the resonant capacitor.

14. The resonant converter according to claim 13, wherein the electrical charge signal and a voltage across the resonant capacitor have same frequency and phase.

15. The resonant converter according to claim 12, wherein the coreless ring coil comprises a Rogowski coil.

16. A resonant converter, comprising:
a switch circuit, comprising a plurality of switches, and receiving an input voltage;
a resonant circuit, electrically connected to the switch circuit;
a transformer, comprising a primary winding and a secondary winding, wherein the primary winding is electrically connected to the resonant circuit;
a rectifier circuit, electrically connected to the secondary winding of the transformer, and providing an output voltage;
a current sensor, electrically connected to the resonant circuit, wherein when a current of the resonant circuit passes through the current sensor, the current sensor generates a current differential signal correspondingly; and
a controller, configured to perform double integration on the current differential signal to acquire an electric charge signal, and configured to control operation of the plurality of switches of the switch circuit according to the electric charge signal, the input voltage and the output voltage,
wherein the current sensor comprises a coreless ring coil.

17. The resonant converter according to claim 16, wherein the resonant circuit comprises a resonant inductor and a resonant capacitor electrically connected to two terminals of the primary winding respectively, and the current sensor is electrically connected between the resonant capacitor and the primary winding.

18. The resonant converter according to claim 17, wherein the electrical charge signal and a voltage across the resonant capacitor have same frequency and phase.

19. The resonant converter according to claim 16, wherein the coreless ring coil comprises a Rogowski coil.

* * * * *